(12) United States Patent
Wang et al.

(10) Patent No.: US 11,774,691 B2
(45) Date of Patent: Oct. 3, 2023

(54) LIGHT EMITTING MODULE AND LIGHT-EMITTING DEVICE HAVING THE SAME

(71) Applicants: LITE-ON OPTO TECHNOLOGY (CHANGZHOU) CO., LTD., Changzhou (CN); LITE-ON TECHNOLOGY CORPORATION, Taipei (TW)

(72) Inventors: Cheng-Han Wang, New Taipei (TW); Szu-Tsung Kao, New Taipei (TW); Chih-Li Yu, New Taipei (TW); Cheng-Hong Su, Taipei (TW); Chun-Wei Huang, New Taipei (TW); Chen-Hsiu Lin, New Taipei (TW)

(73) Assignees: LITE-ON OPTO TECHNOLOGY (CHANGZHOU) CO., LTD., Changzhou (CN); LITE-ON TECHNOLOGY CORPORATION, Taipei (TW)

( * ) Notice: Subject to any disclaimer, the term of this patent is extended or adjusted under 35 U.S.C. 154(b) by 389 days.

(21) Appl. No.: 17/323,051

(22) Filed: May 18, 2021

(65) Prior Publication Data
US 2021/0364687 A1    Nov. 25, 2021

Related U.S. Application Data

(60) Provisional application No. 63/089,296, filed on Oct. 8, 2020, provisional application No. 63/028,617, filed on May 22, 2020.

(30) Foreign Application Priority Data

Sep. 30, 2020 (CN) .......................... 202022221383.9

(51) Int. Cl.
*G08B 5/36* (2006.01)
*G02B 6/42* (2006.01)
*F21V 8/00* (2006.01)

(52) U.S. Cl.
CPC .......... *G02B 6/4262* (2013.01); *G02B 6/0018* (2013.01); *G02B 6/0075* (2013.01);
(Continued)

(58) Field of Classification Search
USPC ............ 340/815.42, 815.45, 815.49, 815.55, 340/815.66, 815.75, 393.3, 333
See application file for complete search history.

(56) References Cited

U.S. PATENT DOCUMENTS 9,784,418 B2 * 10/2017 Van Bommel ............ F21V 9/30
11,096,559 B2 * 8/2021 Kitano ................. A61B 1/0011
(Continued)

*Primary Examiner* — Daniel Previl
(74) *Attorney, Agent, or Firm* — Li & Cai Intellectual Property (USA) Office

(57) ABSTRACT

A light-emitting device and a light emitting module are provided. The light emitting module includes a housing, at least one light guide element, and at least one light emitting element. The housing includes at least one passage passing through its a first surface and a second surface, and a coupling portion formed on an inner surface adjacent to the second surface. The light guide element arranged in the at least one passage has a light emergent surface exposed at one end of the at least one passage and a light incident surface exposed at the other end of the at least one passage. The light emitting element is coupled to the housing by the coupling portion. The light emitting element includes a light emitting surface facing to the light incident surface of the light guide element and a soldering portion exposed from the housing.

21 Claims, 15 Drawing Sheets

(52) U.S. Cl.
CPC .......... *G02B 6/0083* (2013.01); *G02B 6/0088* (2013.01); *G02B 6/0091* (2013.01); *G02B 6/4214* (2013.01); *G02B 6/4298* (2013.01)

(56) References Cited

U.S. PATENT DOCUMENTS

| | | | |
|---|---|---|---|
| 2012/0146481 A1* | 6/2012 | Li | F21V 29/67 |
| | | | 313/46 |
| 2014/0177998 A1* | 6/2014 | Tseng | G02B 6/4214 |
| | | | 385/14 |
| 2019/0031090 A1* | 1/2019 | Stossel | B60Q 3/64 |
| 2020/0030546 A1* | 1/2020 | Cirillo | A61M 5/20 |
| 2021/0116123 A1* | 4/2021 | Feng | F21V 7/24 |

* cited by examiner

LIGHT EMITTING MODULE AND LIGHT-EMITTING DEVICE HAVING THE SAME

CROSS-REFERENCE TO RELATED PATENT APPLICATION

This application claims the benefit of priorities to the U.S. Provisional Patent Application Ser. No. 63/028,617, filed on May 22, 2020, the U.S. Provisional Patent Application Ser. No. 63/089,296, filed on Oct. 8, 2020, and China Patent Application No. 202022221383.9, filed on Sep. 30, 2020 in People's Republic of China. The entire content of the above identified applications are incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a light-emitting device, and more particularly to the light-emitting device including a light emitting module that is capable of being mounted on a printed circuit board to indicate lighting.

BACKGROUND OF THE DISCLOSURE

It has been common to utilize a series of LED lamps as indicator lights. Some applications require right angle indication lights. Right angle indication lights are used in any application that has a motherboard or main circuit board with all the components 90 degrees or right angle to the front panel, faceplate, or operator interface. It is so-called circuit board indicator (CBI). For example, this is the format in telecom rack equipment, servers, computers, disc drives, and other electronic equipment throughout many industries, such as telecommunications, industrial, medical, and consumer products.

However, the conventional circuit board indicator (CBI) has assembly and reliability issues. For example, some applications use a through hole light emitting diode (LED) (an LED with two leads and a dome) that was formed at right angles inside a black LED housing circuit board indicators (CBI) with leads extending enough to mount into two plated through holes in a motherboard or main circuit board. However, the through hole CBI LEDs often do not survive surface mount reflow processing with high temperature.

SUMMARY OF THE DISCLOSURE

An object of the present disclosure is to provide a light emitting module, which has the advantages of convenience in assembly and reliability in connection.

Another object of the present disclosure is to provide a light emitting module that adopts at least one surface mounted light emitting element, such that forming insertion holes for pins on circuit boards are not required.

To achieve the above objects, the present disclosure provides a light emitting module including a housing, at least one light guide element, and at least one light emitting element. The housing includes at least one passage passing through its a first surface and a second surface, and a coupling portion formed on an inner surface adjacent to the second surface. The at least one light guide element is arranged in the at least one passage of the housing. The at least one light guide element has a light emergent surface exposed at one end of the at least one passage and a light incident surface exposed at the other end of the at least one passage. The at least one light emitting element is coupled to the housing by the coupling portion. The at least one light emitting element has a light emitting surface facing to the light incident surface of the at least one light guide element and a soldering portion exposed from the housing, such that light emitted from the light emitting surface enters the light incident surface of the at least one light guide element and is then emitted from the light emergent surface of the at least one light guide element.

To achieve the above objects, the present disclosure provides a light emitting module capable of being mounted on a circuit board. The light emitting module includes a housing, a light guide unit, and a light emitting unit. The housing includes a first sub-housing and a second sub-housing, the first sub-housing and the second sub-housing are coupled to each other. The first sub-casing includes a first surface with at least two openings, a second surface with at least two openings, a partition structure and at least one limiting structure. The partition structure protruding from an inner surface of the first sub-housing is configured to define a first passage and a second passage, wherein the first passage and the second passage are spatially communicated with the corresponding openings formed on the first and second surfaces, respectively. The at least one limiting structure is formed on the inner surface of the first sub-housing. The light guide unit is disposed in the housing, and the light guide unit includes a first light guide element and a second light guide element. The first light guide element is arranged in the first passage, wherein the first light guide element has a first light incident surface and a first light emergent surface, and the first light emergent surface is exposed through one of the at least two openings formed on the first surface. The second light guide element is separated from the first light guide element, and arranged in the second passage, wherein the second light guide element has a second light incident surface and a second light emergent surface, and the second light emergent surface is exposed through the other one of the at least two openings formed on the first surface. The light emitting unit is coupled to the housing, and the light emitting unit includes a first light emitting element and a second light emitting element. The first light emitting element includes a first light emitting surface and a first soldering portion, the first light emitting surface faces toward the first light incident surface of the first light guide element, and the first soldering portion is exposed from the housing. The second light emitting element includes a second light emitting surface and a second soldering portion, the second light emitting surface faces toward the second light incident surface of the second light guide element, and the second soldering portion is exposed from the housing.

To achieve the above objects, the present disclosure provides a light-emitting device that includes an integral housing, a light guide unit and a light emitting unit. The integral housing includes a plurality of separate passages, and the passages pass through a first surface and a second surface of the integral housing. The light guide unit includes a plurality of light guide elements integrally formed in the corresponding passages of the integral housing. Each of the light guide elements includes a light emergent surface exposed at the first surface and a light incident surface exposed at the second surface. The light emitting unit includes a plurality of light emitting elements coupled to the integral housing and respectively disposed corresponding to the light incident surfaces of the light guide elements. The integral housing is coupled to a printed circuit board, and the light emitting unit is electrically connected to the printed circuit board.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
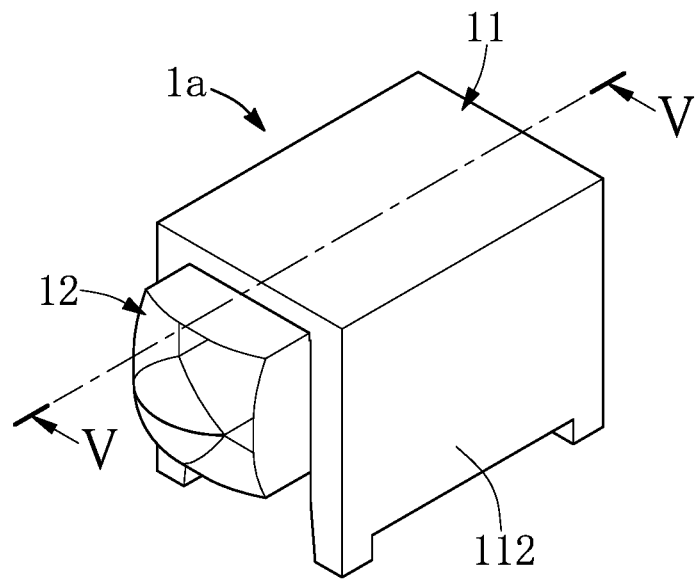
FIG. 1 is a schematic view of a light emitting module according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Embodiments of the present disclosure provide a light emitting module which is for example employed as a light indicator for a light-emitting device. The light emitting module, and the light-emitting device using the light emitting module according to embodiments 1 to 4 will now be described with reference to the accompanying drawings.

First Embodiment

Figure 2:
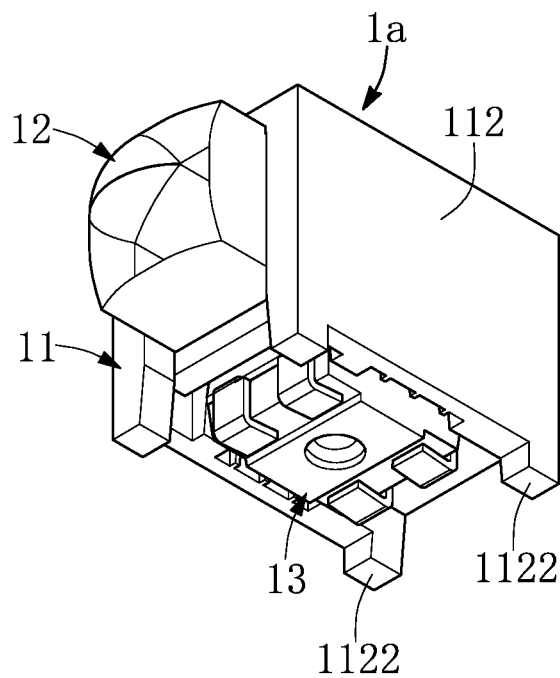
FIG. 2 is another schematic view of the light emitting module according to the first embodiment of the present disclosure.
Figure 3:
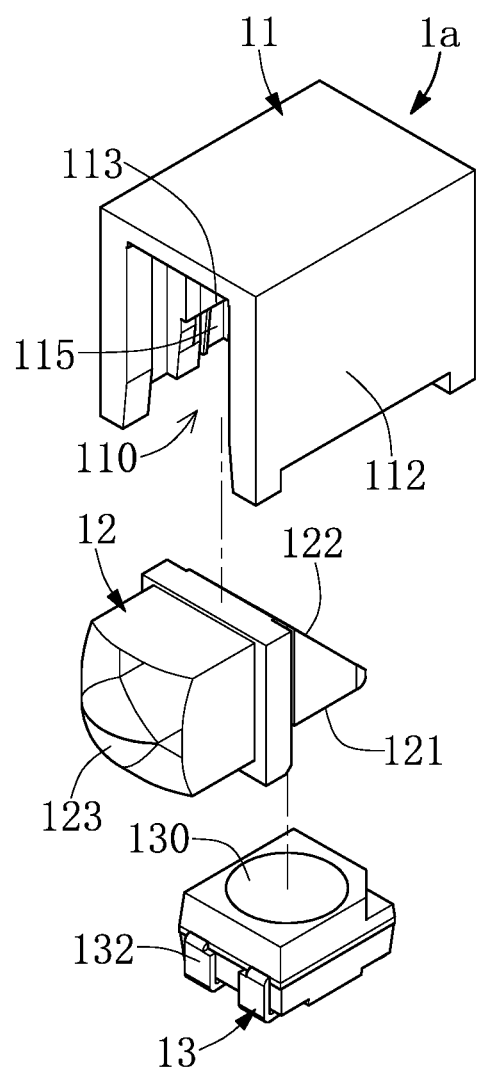
FIG. 3 is an exploded view of the light emitting module according to the first embodiment of the present disclosure.

Referring to FIG. 1 to FIG. 5, a light emitting module 1*a* is provided by the present disclosure. The light emitting module 1*a* is for example a circuit board indicator (CBI), which is capable of being mounted on an external circuit board and employed as a light indicator for a light-emitting device. The light-emitting device is such as servers, computers, disc drives, and other electronic equipment. In this embodiment, the light emitting module 1*a* may be a surface mounted light emitting module. The light emitting module 1*a* includes a housing 11 with a front, back, top, bottom and a pair of side surfaces opposite to each other, a light guide unit 12, and a light emitting unit 13. The housing 11 includes a passage 110 defined by a space between the surfaces of the housing (as shown in FIG. 3). Preferably, the passage 110 is established by at least one channel and/or cavity. And, the passage 110 passes through respective openings on different surfaces, for example, the front and the bottom surfaces of the housing 11. In this embodiment, the housing 11 can be made of opaque material, such as opaque plastics material.

Figure 4:
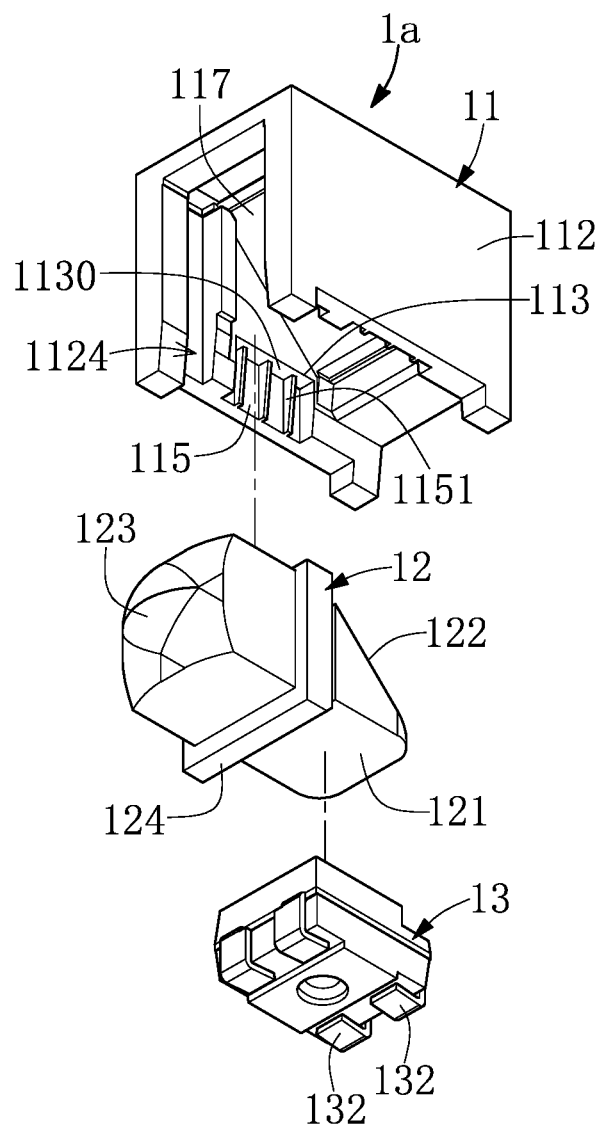
FIG. 4 is another exploded view of the light emitting module according to the first embodiment of the present disclosure.

The light guide unit 12 is disposed in the housing 11; more specifically, the first light guide unit 12 is arranged in the passage 110 of the housing 11. The light guide unit 12 has a light incident surface 121 and a light emergent surface 123, the light emergent surface 123 is exposed by the opening at one end of the passage 110 and the light incident surface 121 is exposed by the opening at the other end of the passage 110. In this embodiment, the light guide unit 12 can be made of resin, silicone, plastic or glass, optionally comprising optically substantially transparent material enabling light transmission. As shown in FIG. 4, the light guide unit 12 further includes an engaging structure 124 integrally formed on the outer surface thereof, and the housing 11 further includes a corresponding limiting structure 1124 integrally formed on the inner surfaces of the sidewalls 112. This design ensures that the light guide unit 12 and the housing 11 coupled together to inhibit sliding therebetween. However, the present disclosure is not limited to this. In other embodiment, the light guide unit 12 can be integrated molded in the housing 11 to omit the limiting structure 1124 and the engaging structure 124.

The light emitting unit 13 is coupled to the housing 11, and the light emitting unit 13 has a light emitting surface 130 and a soldering portion 132. In this embodiment, the light emitting unit 13 may be a surface-mounted light emitting diode, a junction of the soldering portion 132 and an external circuit board 9 faces away from the light emitting surface 130. The quantity and structure of the soldering portion 132 can be designed according to actual requirements, and thus omit details herein.

In this embodiment, a coupling portion 113 is formed on the inner peripheral surface, for example, an inner lower surface of each of a pair of sidewalls 112 of the housing, such that the light emitting unit 13 can be coupled to the inner surface of the housing 11 by the coupling portion 113. The light emitting surface 130 of the light emitting unit 13 faces to one end of the passage 110, and the soldering portion 132 configured to be electrically coupled to the circuit board is exposed from the housing 11, for example, exposed at the bottom surface of the housing 11, such that light emitted by the light emitting unit 13 can enter from the light incident surface 121 of the light guide unit 12 and is then emitted from the light emergent surface 123 of the light guide unit 12.

An internal structure of the light emitting module 1a is described as follows. The coupling portion 113 is configured to join the light emitting unit 13, in the embodiment, a quantity of the coupling portion 113 can be one or more. In other words, the coupling portion 113 can be formed as a continuous structure or as a set of discrete structures. For example, the coupling portion 113 is formed on the inner lower surface of each of the pair of sidewalls 112, and each of the coupling portions 113 includes an abutted surface 1130. The abutted surfaces 1130 are configured to be coplanar, such that the light emitting unit 13 abuts against the abutted surfaces 1130 to couple the housing 11 stably and appropriately positioned. More specifically, the coupling portion 113 further includes an adhesive accommodating portion 115 formed on the inner lower surface of each of the pair of sidewalls 112, respectively. Each of the adhesive accommodating portions 115 is recessed in the inner lower surface of the pair of sidewalls 112, arranged between the abutted surface 1130 and a bottom edge of each of the pair of sidewalls 112, and faces a side surface of the light emitting unit 13. An adhesive layer, for example, glue or other like (not shown in the figures) can be received within the adhesive accommodating portions 115 to increase the adhesion force between the light emitting unit 13 and the housing 11. In this embodiment, the adhesive accommodating portion 115 is defined by a plurality of protruding ribs 1151, and the substantially parallel protruding ribs 1151 are perpendicular to the abutted surface 1130 to form a plurality of adhesive accommodating grooves of the adhesive accommodating portion 115. In other embodiments, a width of each of the protruding ribs 1151 is gradually tapered from the abutted surface 1130 toward the bottom edge of each of the pair of sidewalls 112, but the quantity and structure of the adhesive accommodating portions 115 are not limited thereto.

Refer back to FIGS. 2 and 4, the housing 11 can further include an attachment means in the form of, for example, positioning protrusions to mount onto the external circuit board. In the embodiment, a plurality of positioning protrusions 1122 protrude from the bottom edges of the pair of sidewalls 112. As shown in FIG. 2, a quantity of the positioning protrusions 1122 of the light emitting module 1a, in this embodiment, is exemplified as being four, and the light emitting module 1a can be easily positioned and mounted on the external circuit board 9, and the light emitting unit 13 can be accommodated in a space surrounded by the positioning protrusions 1122 and coupled to the housing 11 by the coupling portion 113.

In this embodiment, a bottom surface of the light emitting unit 13 does not exceed from a bottom surface of each of the positioning protrusions 1122, but the present disclosure is not limited thereto. In another embodiment, the positioning protrusions 1122 can be omitted or replaced by another positioning, alignment or locking manners.

Figure 5:
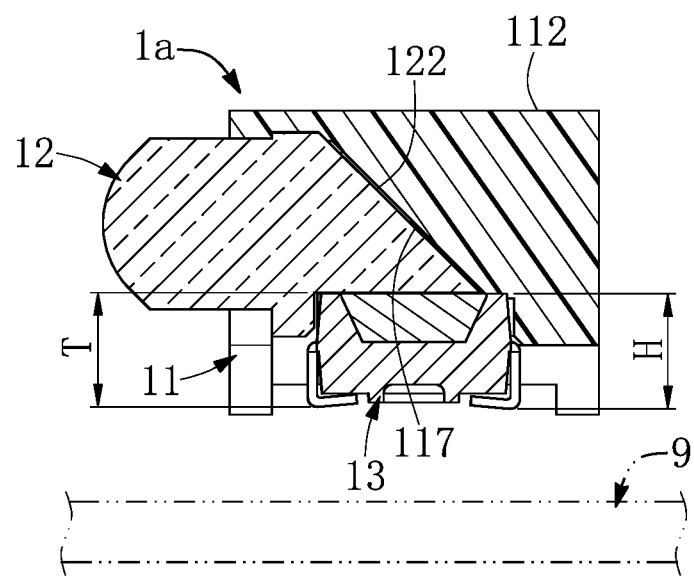
FIG. 5 is a cross-sectional view taken along line V-V of FIG. 1.

As shown in FIG. 4 and FIG. 5, the light guide unit 12 of this embodiment has a reflective surface 122. The reflective surface 122 is an inclined surface that is inclined to the light incident surface 121 of the light guide unit 12, but the present disclosure is not limited thereto. An inner wall of the housing 11 has a corresponding inclined surface 117, and the reflective surface 122 of the light guide unit 12 abuts against the inclined surface 117 of the housing 11. The light emitted by the light emitting unit 13 can enter the light incident surface 121 of the light guide unit 12, be reflected by the reflective surface 122, and then be emitted through the light emergent surface 123. In other embodiments, the inclined surface 117 can have a reflection function, but the present disclosure is not limited thereto. In addition, as shown in FIG. 5, an overall thickness T of the light emitting unit 13 is greater than or equal to a height H from the abutted surface 1130 to each of the bottom edges of the pair of sidewalls 112.

Furthermore, transparencies of the light incident surface 121 and the light emergent surface 123 of the light guide unit 12 can be different or the same. Specifically, the light incident surface 121 of the light guide unit 12 can be a fully-transparent or a matte surface, and the light emergent surface 123 of the light guide unit 12 can also be a fully-transparent or a matte surface.

The light emitting unit 13 can be at least one single-color light emitting diode (LED) or multi-color LED. In other words, the light emitting unit 13 can comprise a single LED emitting a single color of light; or the light emitting unit 13 can also comprise many different LEDs emitting different colors of light, and lights of different colors can be emitted through controlling the light emitting unit 13.

Second Embodiment

Figure 6:
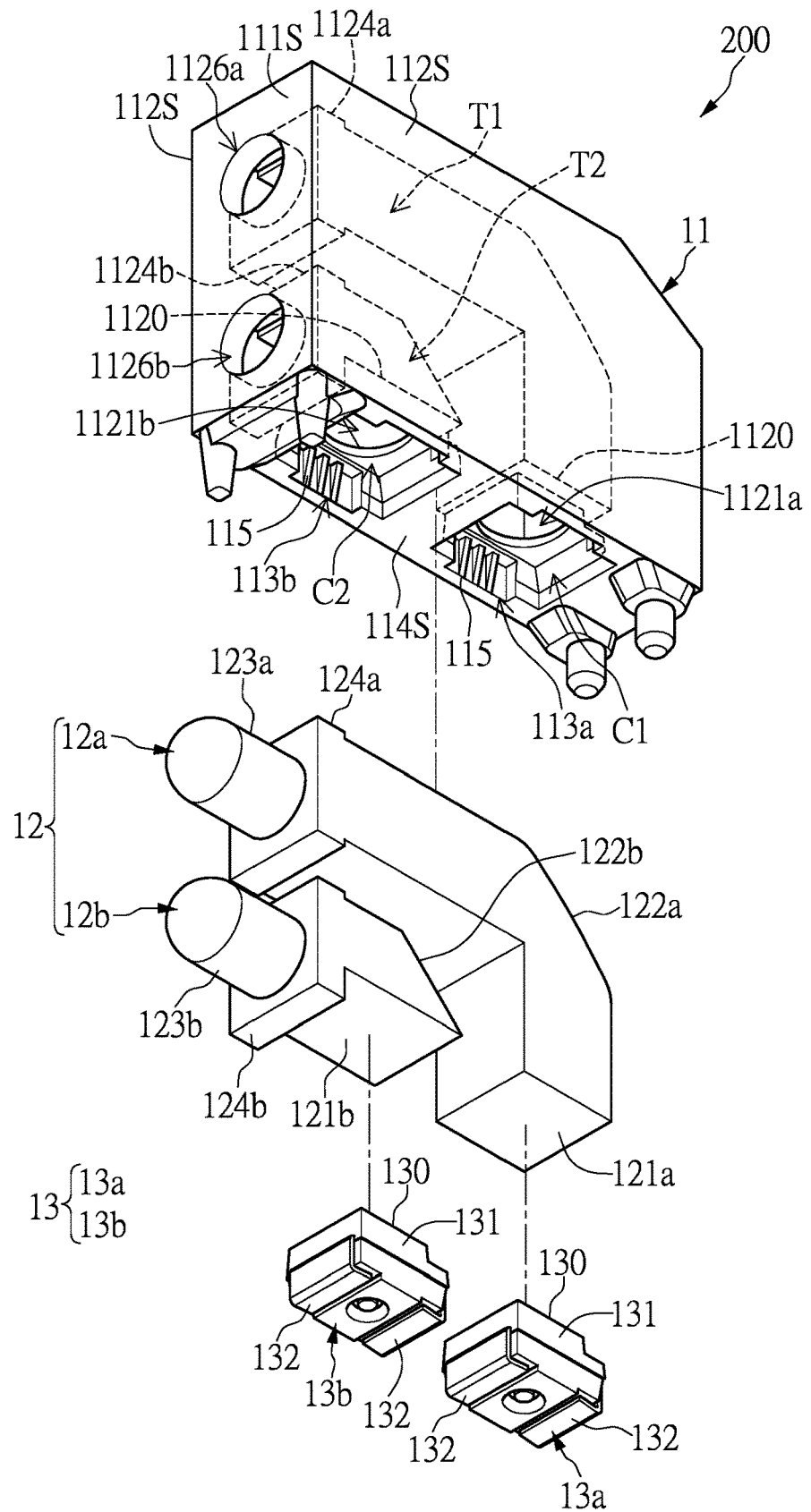
FIG. 6 is a schematic exploded view of a light emitting module according to a second embodiment of the present disclosure.
Figure 7:
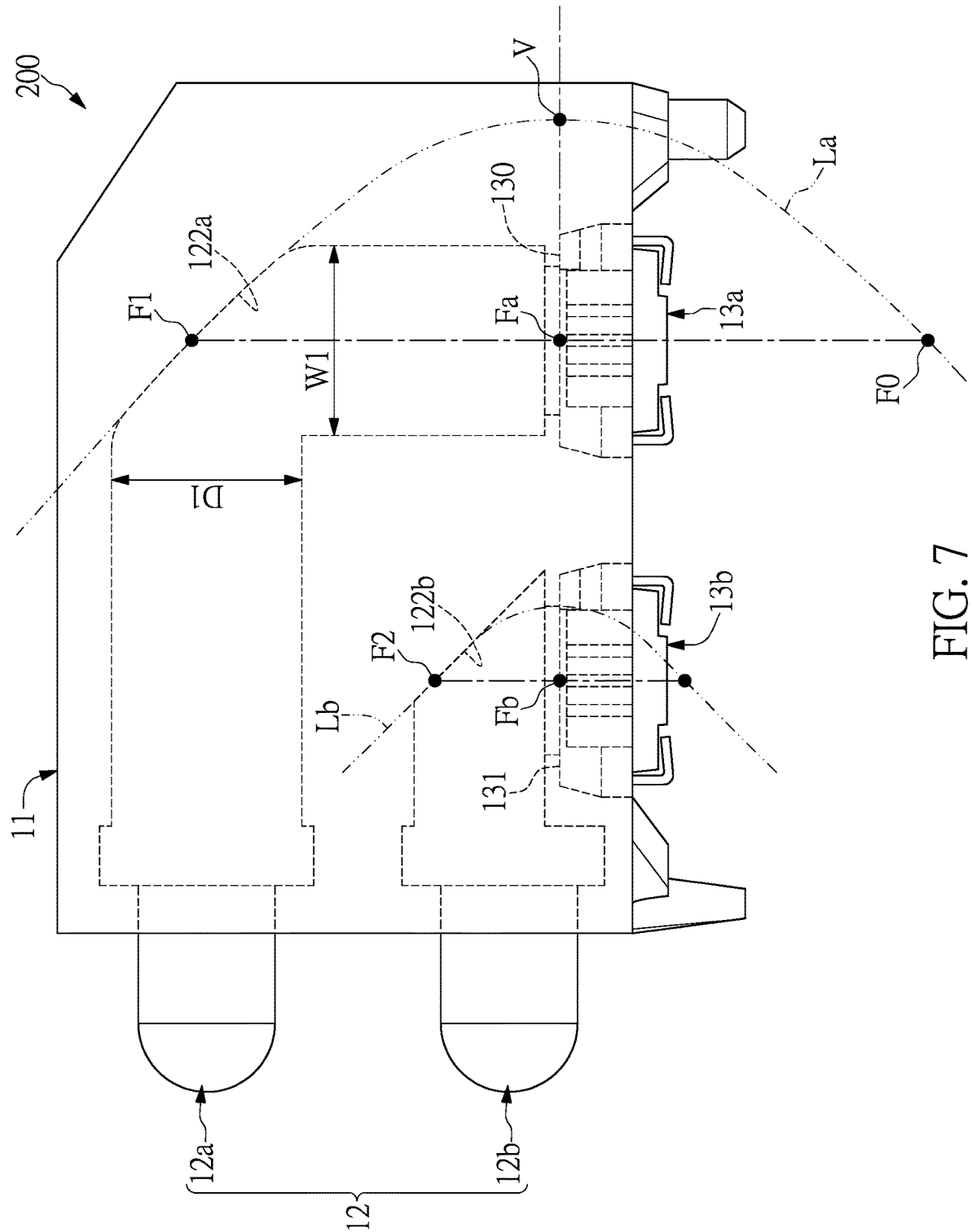
FIG. 7 is a side perspective view of the light emitting module according to the second embodiment of the present disclosure.
Figure 8:
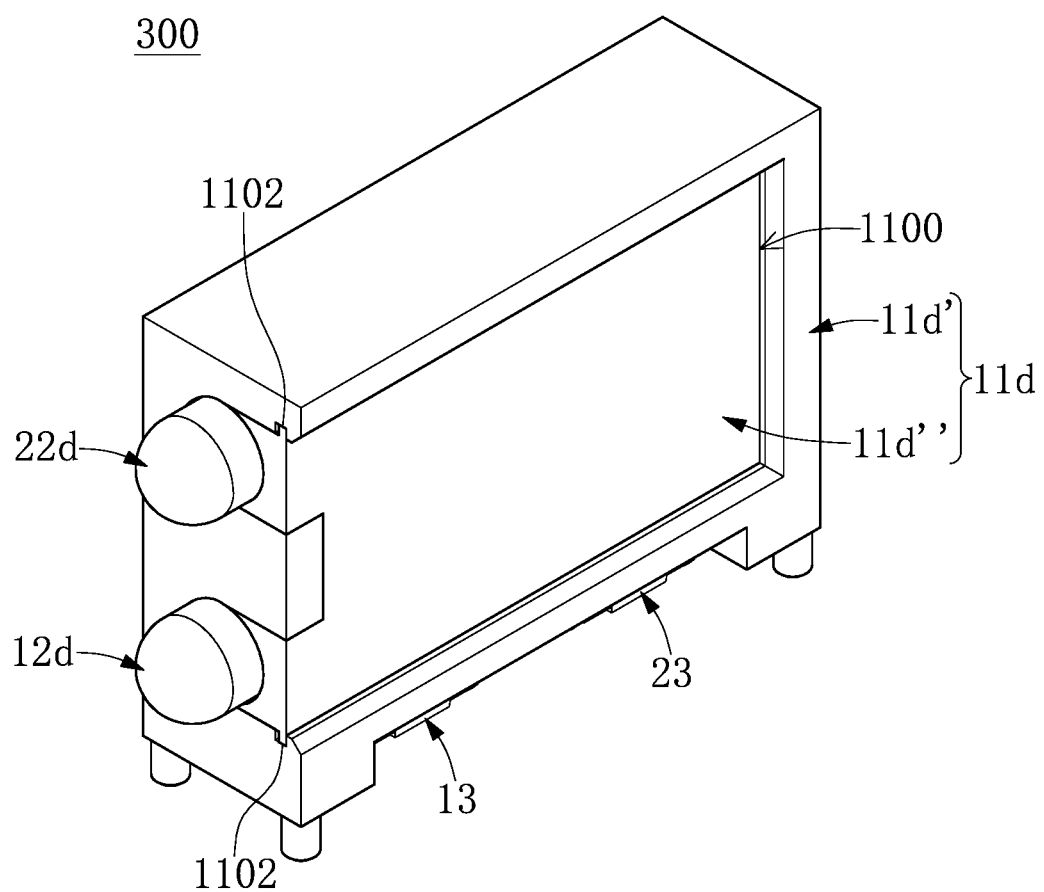
FIG. 8 is a schematic view of a light emitting module according to a third embodiment of the present disclosure.

Referring to FIG. 6 and FIG. 7, in this embodiment, a light-emitting module 200 is provided. At least one passage is formed penetrating through the housing 11. Specifically, the housing 11 and the at least one passage are an integrally-formed structure, such as hollow barrel-shaped or any hollow cubic-shaped. The material of the housing 11 may be opaque plastic, which can be made by injection molding method. Furthermore, the housing 11 has a first surface 111S and a second surface 114S. The first surface 111S and the second surface 114S are contiguous to a pair of side surfaces 112S correspondingly. In this embodiment, the housing 11 further has a third surface 1120, and at least one recessed portion which is defined between the second surface 114S and the third surface 1120. In brief, the recessed portion is a receiving space that is concaved from the second surface 114S toward the interior of the housing 11. Specifically, as shown in FIG. 6, the housing 11 defines a first recessed portion C1 and a second recessed portion C2. Each of the first and second recessed portions C1, C2 is formed between the second surface 114S and the third surface 1120. In addition, the housing 11 includes coupling portions 113a, 113b formed on the inner surfaces of recessed portions C1, C2, respectively. In the second embodiment, the coupling portion (113a-113b) is similar to that in the above-described embodiment, and it will not be reiterated herein.

In this embodiment, a first passage T1 and a second passage T2 are formed in the housing 11 as an example. The first passage T1 and the second passage T2 in the housing 11 are isolated from each other, so as to avoid optical cross-talk. More specifically, a first front opening 1126a and a second front opening 1126b are formed on the first surface 111S of the housing 11. A first bottom opening 1121a and the second bottom opening 1121b are formed on the third surface 1120 of the housing 11. The first passage T1 is extended from the first front opening 1126a and spatially communicated to the first bottom opening 1121a. The second passage T2 is extended from the second front opening 1126b and spatially communicated to the second bottom opening 1121b.

Preferably, the housing 11 includes a limiting structure formed on the inner surface thereof. In the embodiment, the limiting structure may be, for example, a first receiving slot 1124a and a second receiving slot 1124b. The first receiving slot 1124a is located close to the first front opening 1126a. The second receiving slot 1124b is located close to the second front opening 1126b. A cross-sectional area of the first receiving slot 1124a is larger than that of the first front opening 1126a. A cross-sectional area of the second receiving slot 1124b is larger than that of the second front opening 1126b. Further, the first and the second receiving slot 1124a, 1124b are communicated with the first and second passages T1, T2, respectively. In addition, the first recessed portion C1 is corresponded to and spatially communicated with the first bottom opening 1121a of the first passage T1. The second recessed portion C2 is corresponded to and spatially communicated with the second bottom opening 1121b of the second passage T2.

In this embodiment, the light guide unit 12 includes a first light guide element 12a and a second light guide element 12b. The first light guide element 12a and the second light guide element 12b are injected and molded in the first passage T1 and the second passage T2 respectively. The first light guide element 12a and the second light guide element 12b are integrated molded in the housing 11 for example by use of injection molding, insert injection molding, two-shot molding or a combination thereof. Therefore, the housing 11 and the light guide unit 12 are formed a one-piece integral structure. The material of the light guide unit can be, such as transparent silicone or plastic, and preferably is made of optically transparent light guiding material. Specifically, the first light guide element 12a, and the second light guide element 12b can be made of a material such as self-adhesive silicone, or the inner wall of the housing 11 can be applied with adhesive primer during the injection molding process, so that the first light guide element 12a and the second light guide element 12b can tightly adhere to the inner wall in the first passage T1 and the second passage T2 of the housing 11. Therefore, the adherence between the first light guide element 12a, the second light guide element 12b, and the housing 11 can be enhanced. In this embodiment, the shape and structure of the first light guide element 12a and the first passage T1 are matched mutually and conformally. The shape and structure of the second light guide element 12b and the second passage T2 matched mutually and conformally. Therefore, the first light guide element 12a, the second light guide element 12b, and the housing 11 are integrally formed in one piece. The combined strength of the first light guide element 12a, the second light guide element 12b, and the housing 11 are increased, to avoid the problems of the traditional light pipe and housing, such as easy to fall off, and position deviation. In addition, the first light guide element 12a, the second light guide element 12b are separated completely, without any connection portion, so that it can avoid optically cross-talk or light leakage.

More specifically, the first light guide element 12a has a first light emergent portion 123a, a first engaging structure 124a, and a first light incident portion 121a. The second light guide element 12b has a second light emergent portion 123b, a second engaging structure 124b, and a second light incident portion 121b. When the first light guide element 12a and the second light guide element 12b are injected and molded in the first passage T1 and the second passage T2 of the housing 11, the first light incident portion 121a of the first light guide element 12a is exposed to the first bottom opening 1121a, and the first light emergent portion 123a is exposed to the first front opening 1126a of the housing 11. The second light incident portion 121b of the second light guide element 12b is exposed to the second bottom opening 1121b, and the second light emergent portion 123b is exposed to the second front opening 1126b of the housing 11. Furthermore, the first engaging structure 124a is formed close to the first light emergent portion 123a and extended outward to insert in the first receiving slot 1124a. The second engaging structure 124b is formed close to the second light emergent portion 123b and extended outward to insert in the second receiving slot 1124b. The contour of the first engaging structure 124a corresponds to the shape of the first receiving slot 1124a. The contour of the second engaging structure 124b corresponds to the shape of the second receiving slot 1124b.

In this embodiment, the light emitting module 200 can be a surface-mounted light emitting module, but it is not limited thereto. The light emitting unit 13 includes a first and a second light emitting elements 13a, 13b. The first and second light emitting elements 13a, 13b have a light emitting surface 130, and a pair of soldering portions 132, respectively. The first light emitting element 13a, and the second light emitting element 13b are received in the first recessed portion C1, and the second recessed portion C2 of the housing 11, respectively. The light emitting surfaces 130 of the first and the second light emitting elements 13a, 13b face the first light incident portion 121a of the first light guide element 12a and the second light incident portion 121b of the second light guide element 12b, respectively. Therefore, the light emitted from the light emitting element 13a can enter from the first light incident portion 121a and exit by the first light emergent portion 123a of the first light guide element 12a. Also, the light emitted from the light emitting element 12b can enter from the second light incident portion 121b and exit by the second light emergent portion 123b of the second light guide element 12b.

In addition, the first light guide element 12a, and the second light guide element 12b respectively form a first reflective surface 122a, and a second reflective surface 122b. The first reflective surface 122a is formed between the first light incident portion 121a and the first light emergent portion 123a. The second reflective surface 122b is formed between the second light incident portion 121b and the second light emergent portion 123b. In this embodiment, for example, the first reflective surface 122a forms a shape approximately similar to a parabolic curve, a first parabolic-like curve La. The second reflective surface 122b forms a shape approximately similar to a parabolic curve, a second parabolic-like curve Lb. According to simulation results, the emitted light from the second light guide element 12b and the first light guide element 12a each with the parabolic-like curve are more collimated.

By utilizing the structures discussed above of the light emitting module of the present disclosure, the module that unitarily includes the light guide elements and the light emitting elements in an integral housing can be realized. By forming a multi-level light emitting module as a unitary indicator module, that module can be easily mounted on a printed circuit board for a light-emitting device, and particularly in multiple rows to form a matrix of light outputs.

Third Embodiment

Referring to FIG. 8 to FIG. 12, the difference between the third embodiment and the first embodiment is that, in this embodiment, a housing 11d of a light emitting module 300 has a first sub-housing 11d' and a second sub-housing 11d''', the first sub-housing 11d' and the second sub-housing 11d''' are coupled to each other. The first sub-housing 11d' has a partition structure 1125 protruding from the inner wall surface thereof, such that the first sub-housing 11d' has separate first and second passages T1, T2, respectively. The first and second passages T1, T2 can accommodate a first light guide element 12d and a second light guide element 22d, respectively.

Figure 9:
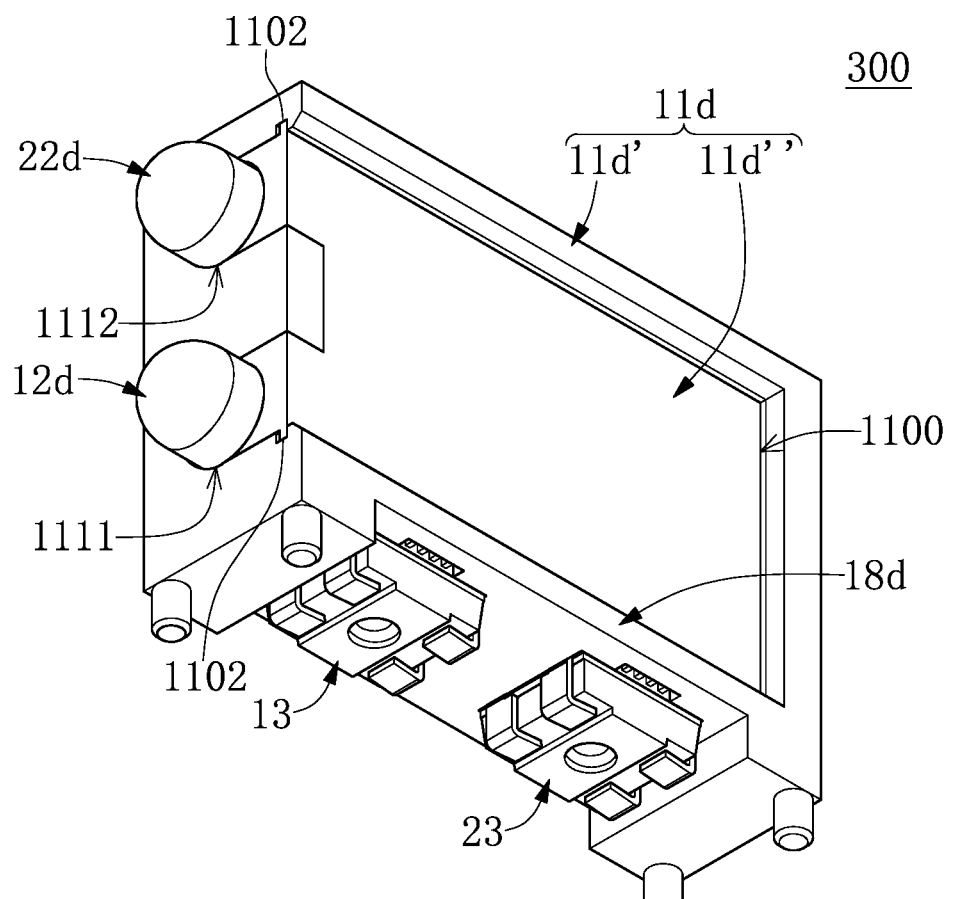
FIG. 9 is another schematic view of the light emitting module according to the third embodiment of the present disclosure.

In this embodiment, the first sub-housing 11d' further includes a side opening 1100 facing to the second sub-housing 11d'''. In addition, the first sub-housing 11d' may include a first fixing structure, and the second sub-housing 11d''' may include a second fixing structure. As shown in FIG. 9, the first fixing structure may be, for example, a groove 1102 formed on the first sub-housing 11d', and the second fixing structure may be a protruding part which integrally formed with the second sub-housing 11d'''. Therefore, the second sub-housing 11d''' can be, for example, a movable side cover to engage with the groove 1102 of the first sub-housing 11d' by the second fixing structure.

Furthermore, a plurality of openings are formed on different surfaces of the housing 11d. For example, a first front opening 1111 and a second front opening 1112 are formed on the front surface 111, a first bottom opening 1810 and a second bottom opening 1820 are formed on the bottom surface 18d of the housing 11d. The first passage T1 is extended from the first front opening 1111 and spatially communicated to the first bottom opening 1810. The second passage T2 is extended from the second front opening 1112 and spatially communicated to the second bottom opening 1820.

The first light guide element 12d and the second light guide element 22d are disposed in the first sub-housing 11d'; more specifically, the first and second light guide elements 12d, 22d are arranged in the first and second passages T1, T2 of the first sub-housing 11d'. The first light guide element 12d has a first light incident surface 121 and a first light emergent surface 123, the first light emergent surface 123 is exposed by the first front opening 1111, and the first light incident surface 121 is exposed by the first bottom opening 1810. Similarly, the second light guide element 22d has a second light incident surface 221 and a second light emergent surface 223, the second light emergent surface 223 is exposed by the second front opening 1112, and the second light incident surface 221 is exposed by the second bottom opening 1820.

Furthermore, the partition structure 1125 has a cross-section in the form of inverted L-shaped, and the partition structure 1125 can be made of a non-transparent or substantially non-transparent polymeric material, or coated with a light-shielding layer, so that light passing through the first light guide element 12d and the second light guide element 22d can be smoothly guided out without being affected by optical cross-talk or light leakage therebetween.

In addition, the first light guide element 12d is a strip-shaped structure, and a first light incident surface 121 thereof directly faces the first light emitting surface 130 of the first light emitting element 13. The second light guide element 22d is a bent structure, the "bent structure" refers to a structure having a curved conformation, e.g., substantially an inverted L-shaped structure, and a second light incident surface 221 thereof directly faces the second light emitting surface 230 of the second light emitting element 23.

Figure 10:
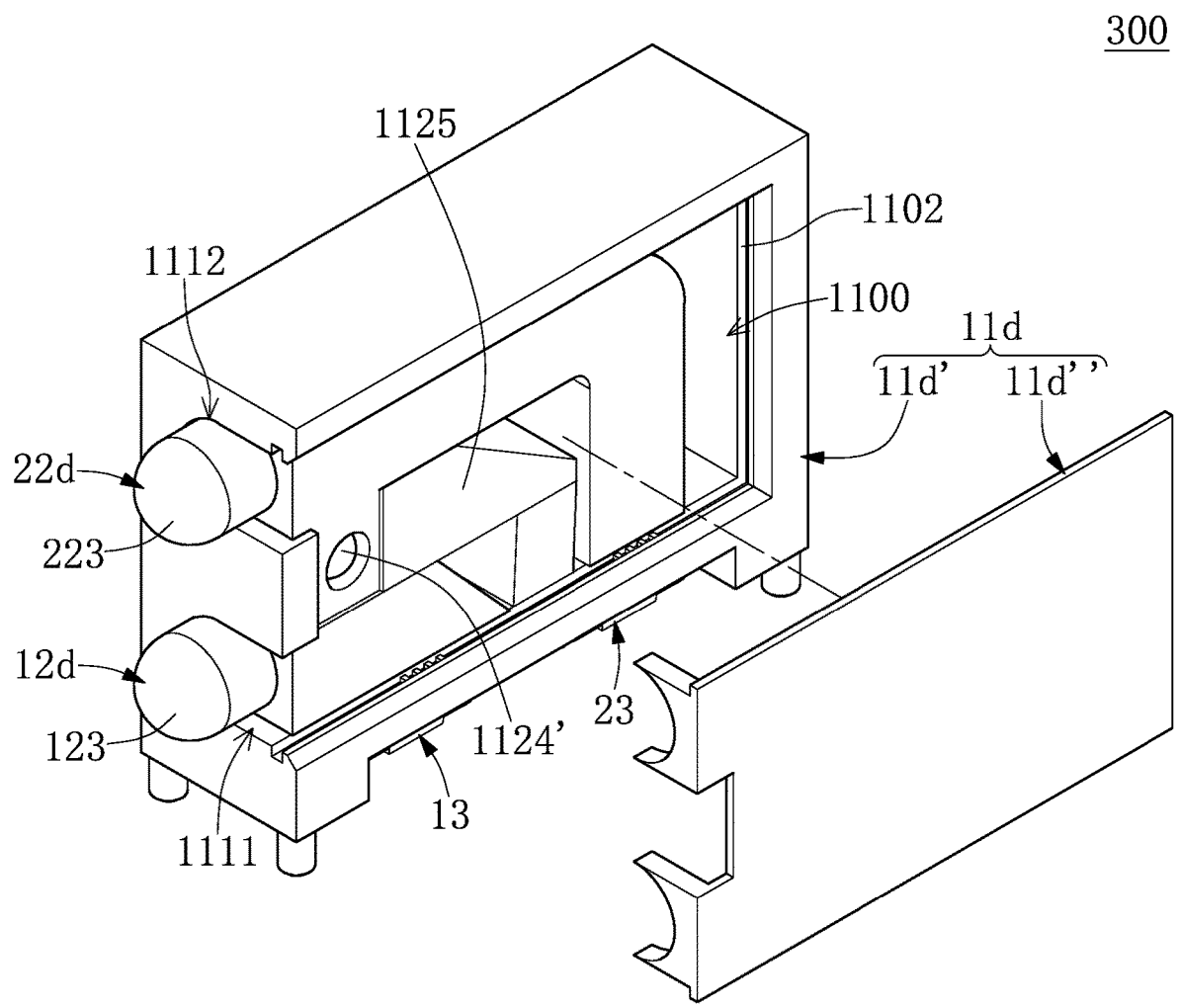
FIG. 10 is a schematic view showing a movable side cover of the light emitting module being opened according to the third embodiment of the present disclosure.
Figure 11:
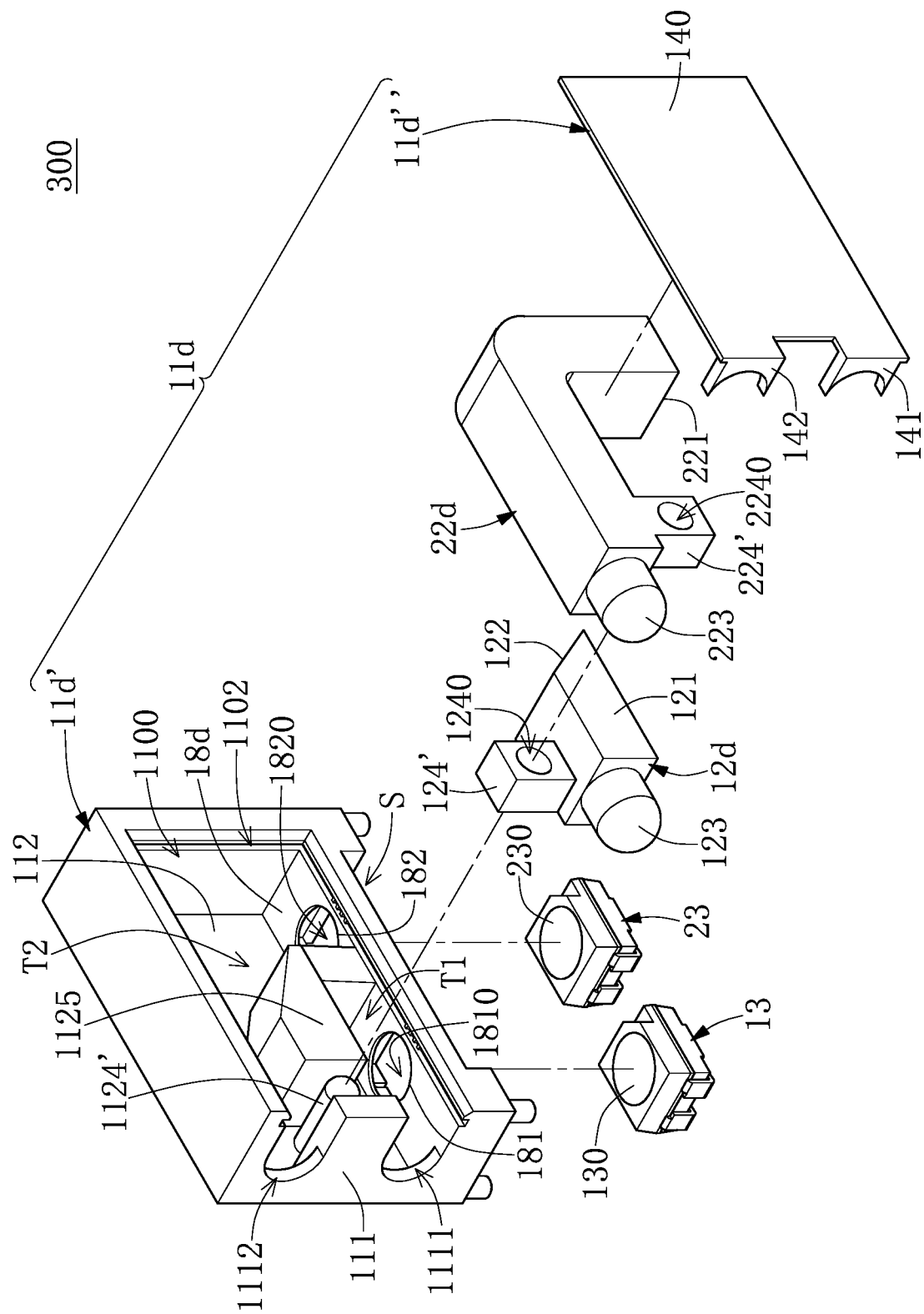
FIG. 11 is an exploded view of the light emitting module according to the third embodiment of the present disclosure.

Moreover, the housing 11d includes at least one limiting structure 1124' protruding from an inner surface thereof (as shown in FIG. 10 and FIG. 11). In this embodiment, the limiting structure 1124' is integrally formed on the inner surface of the first sidewall 112 and extends toward the side opening 1100. The first light guide element 12d has a corresponding first engaging structure 124' that faces and protrudes toward the second light guide element 22d, and the second light guide element 22d also has a corresponding second engaging structure 224' that faces and protrudes toward the first light guide element 12d. More specifically, the limiting structure 1124' of this embodiment can be a protruding column, the first engaging structure 124' can form a first through hole 1240, and the second engaging structure 224' can form a second through hole 2240. The first engaging structure 124' and the second engaging structure 224' are stacked and sleeved on the limiting structure 1124', so as to form a dual-level light guide unit. In addition, side surfaces of the first light guide element 12d and the second light guide element 22d that are assembled are substantially flush with each other. In other words, the two light guide elements (12d, 22d) substantially have the same thickness. More specifically, a thickness of the first engaging structure 124' of the first light guide element 12d is substantially half a thickness of the first light guide element 12d, and a thickness of the second engaging structure 224' of the second light guide element 22d is substantially half a thickness of the second light guide element 22d. Hence, the first and second engaging structures 124' and 224' are stacked to each other and sleeved on the limiting structure 1124', so that the side surfaces of the light guide elements are flush with each other.

Figure 12:
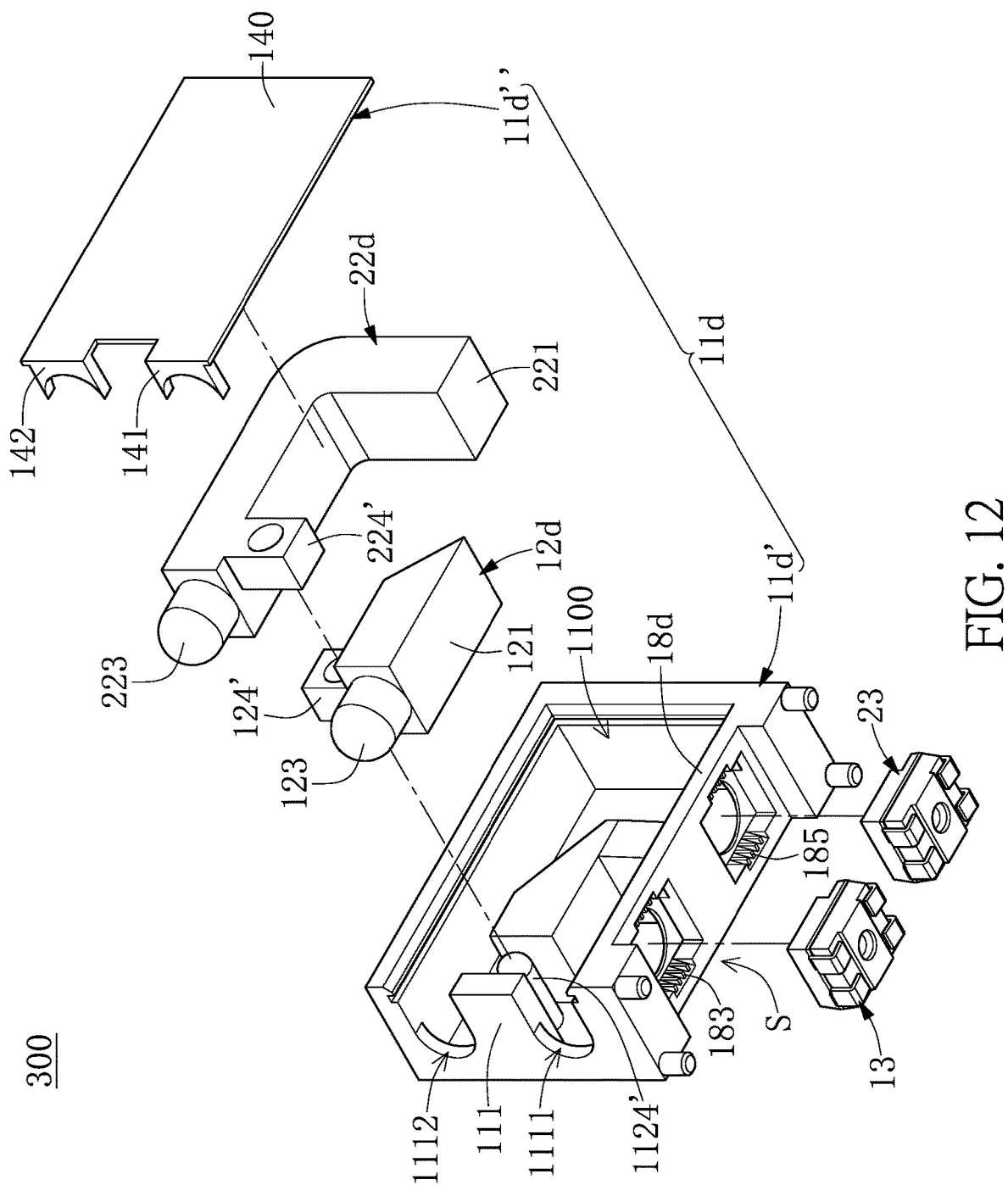
FIG. 12 is another exploded view of the light emitting module according to the third embodiment of the present disclosure.

In addition, as shown in FIG. 11 and FIG. 12, the bottom surface 18d has a recessed space S in a top direction of the housing 11d so that the first light emitting element 13 and the second light emitting element 23 are arranged in the recessed space. More specifically, the bottom surface 18d of the first sub-housing 11d' has a first coupling portion 181 having a first adhesive accommodating portion 183, and a second coupling portion 182 having a second adhesive accommodating portion 185, so that the first light emitting element 13 and the second light emitting element 23 are adhered to the bottom surface 18d. The structure of the first and second coupling portions 181, 182 are quite similar to that of the first embodiment, so this detailed description will be omitted for the sake of brevity.

Furthermore, the second sub-housing 11*d*" of this embodiment includes a side cover body 140 and a pair of limiting portions 141 and 142 corresponding to a first front opening 1111 and a second front opening 1112, respectively. A front end of the first light guide element 12*d* is limited between the first front opening 1111 of the first sub-housing 11*d*' and the limiting portions 141 of the second sub-housing 11*d*". A front end of the second light guide element 22*d* is limited between the second front opening 1112 of the first sub-housing 11*d*' and the limiting portions 142 of the second sub-housing 11*d*". Specifically, the groove 1102 is formed along the side opening 1100 on an edge of the first sub-housing 11*d*'. In another embodiment, a guide slope is further formed on an outermost edge of the first sub-housing 11*d*', such that the second sub-housing 11*d*" can be easily inserted into the groove 1102 and that the side opening 1100 is covered, so as to complete the assembly process. When the light emitted from the first light emitting element 13 enters the first light incident surface 121 of the first light guide element 12*d*, the light is reflected by the reflective surface 122, and after being totally reflected, the light is emitted from the first light emergent surface 123. Similarly, when the light emitted from the second light emitting element 23 enters the second light incident surface 221 of the second light guide element 22*d*, the light is totally reflected and then emitted from the second light emergent surface 223.

Fourth Embodiment

Figure 16:
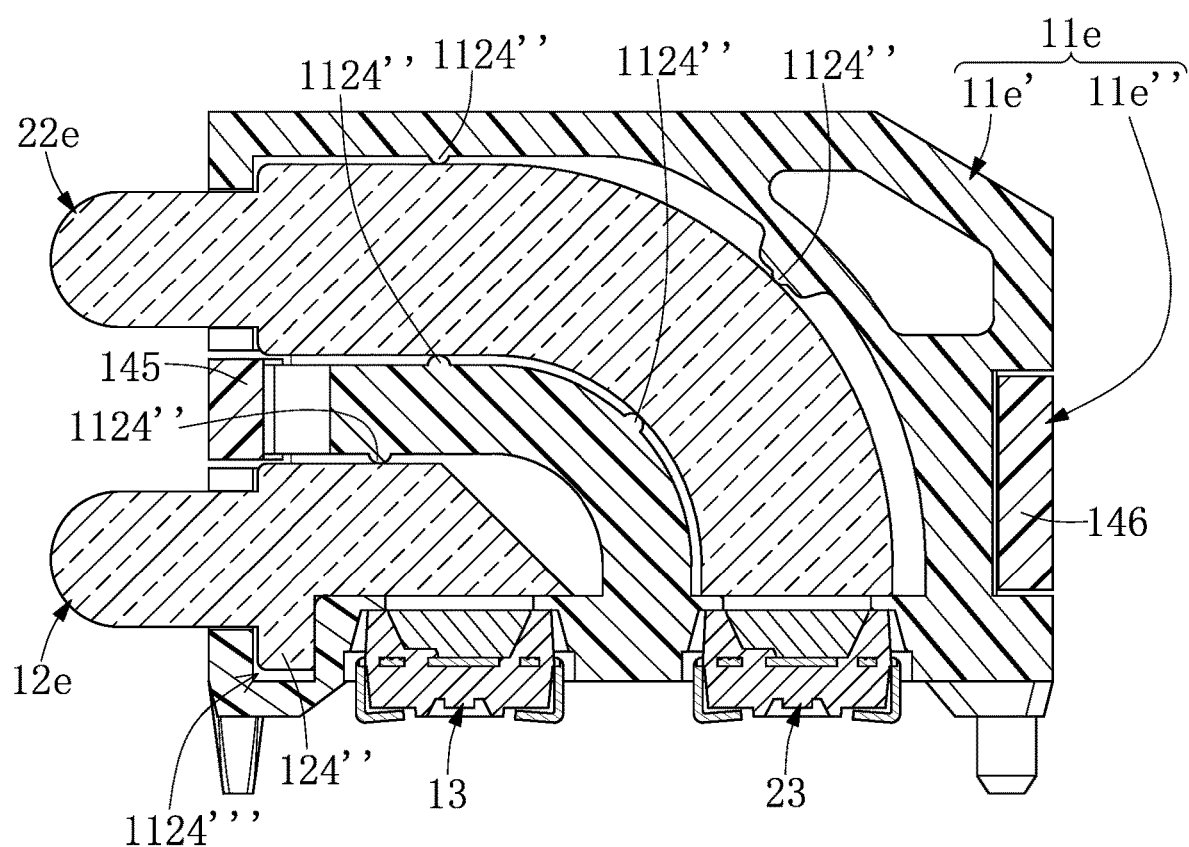
FIG. 16 is a cross-sectional view of the light emitting module according to the fourth embodiment of the present disclosure.

Referring to FIG. 13 to FIG. 16, the differences between the fourth embodiment and the third embodiment is the manner that the two light guide elements are limited (or fixed) and the manner that the first sub-housing and the second sub-housing are assembled. In this embodiment, a number of the first limiting structure 1124" can be one or more. As shown in FIG. 16, a number of the first limiting structure 1124" (e.g., a protruding rib or a bump) is four, two of which protrude from an upper inner surface of the first sub-housing 11*e*' and the other two of which protrude from a top surface of the partition structure 1125, Therefore, it facilitates the assembly of a second light guide element 22*e* into a second passage T2, and prevent the second light guide element 22*e* from being displaced or falling off from the first sub-housing 11*e*'. Similarly, the first limiting structure 1124" can also be formed on a bottom surface of the partition structure 1125 (as shown in FIG. 16) abutting against a top surface of a first light guide element 12*e* to prevent the first light guide element 12*e* from being displaced or falling off from the first sub-housing 11*e*'. However, it should be understood that the number of first limiting structure 1124" included in the light emitting module 11*e* is not limited thereto.

Similar to the first embodiment, an engaging structure 124" is formed and extended from a bottom surface of the first light guide element 12*e*. A second limiting structure 1124'" is formed between a front surface 111 and a bottom surface 18*e* of the first sub-housing 11*e*'. In this embodiment, the engaging structure 124" is, such as a flange, and a second limiting structure 1124'" is, such as a groove or a receiving slot, so that the engaging structure 124" can be slidably inserted into the limiting structure 1124'. Therefore, the first light guide element 12*e* can be assembled to the first sub-housing 11*e*', and prevented from being displaced or falling off therefrom.

Figure 13:
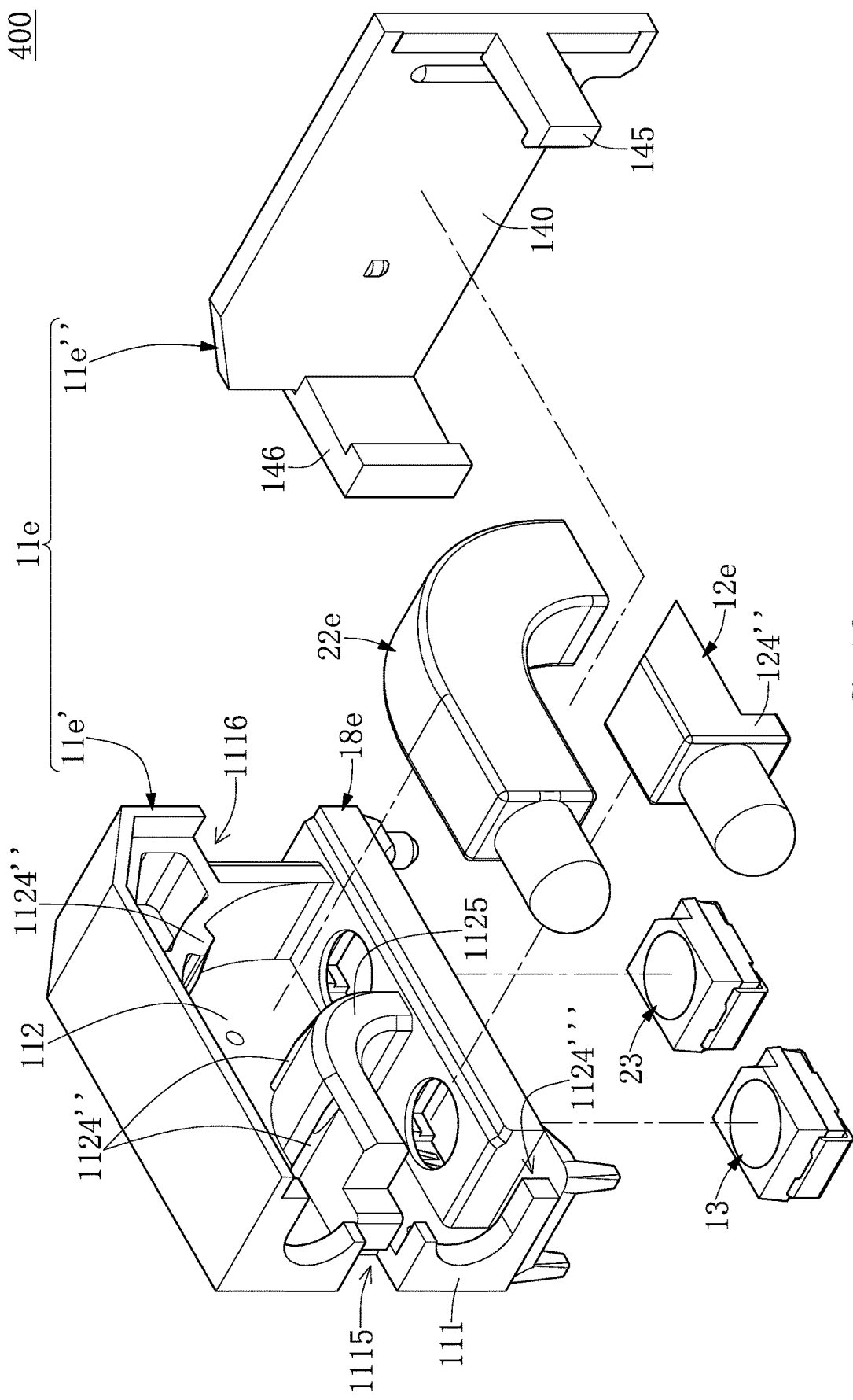
FIG. 13 is an exploded view of the light emitting module according to a fourth embodiment of the present disclosure.
Figure 14:
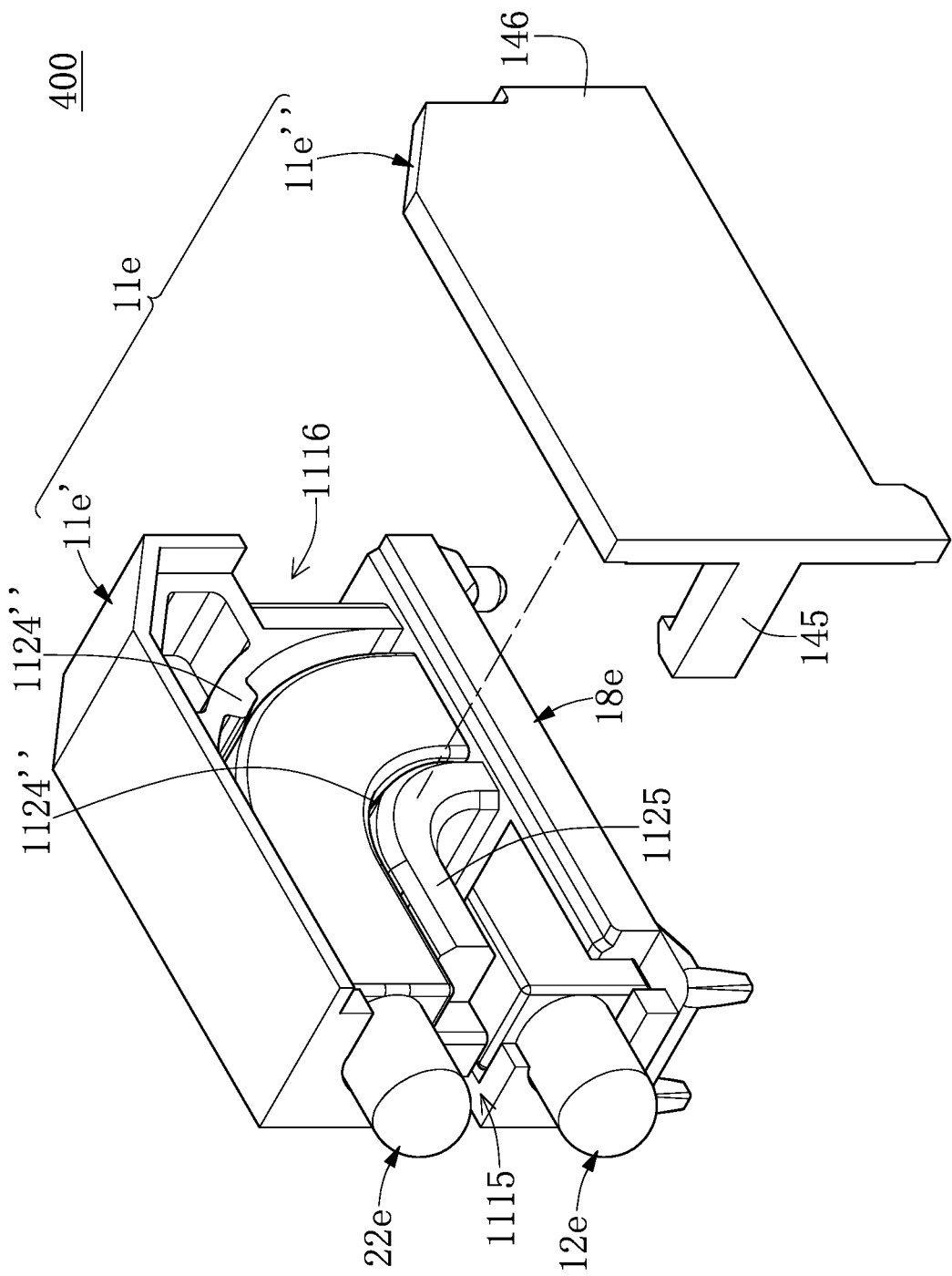
FIG. 14 is another exploded view of the light emitting module according to the fourth embodiment of the present disclosure.
Figure 15:
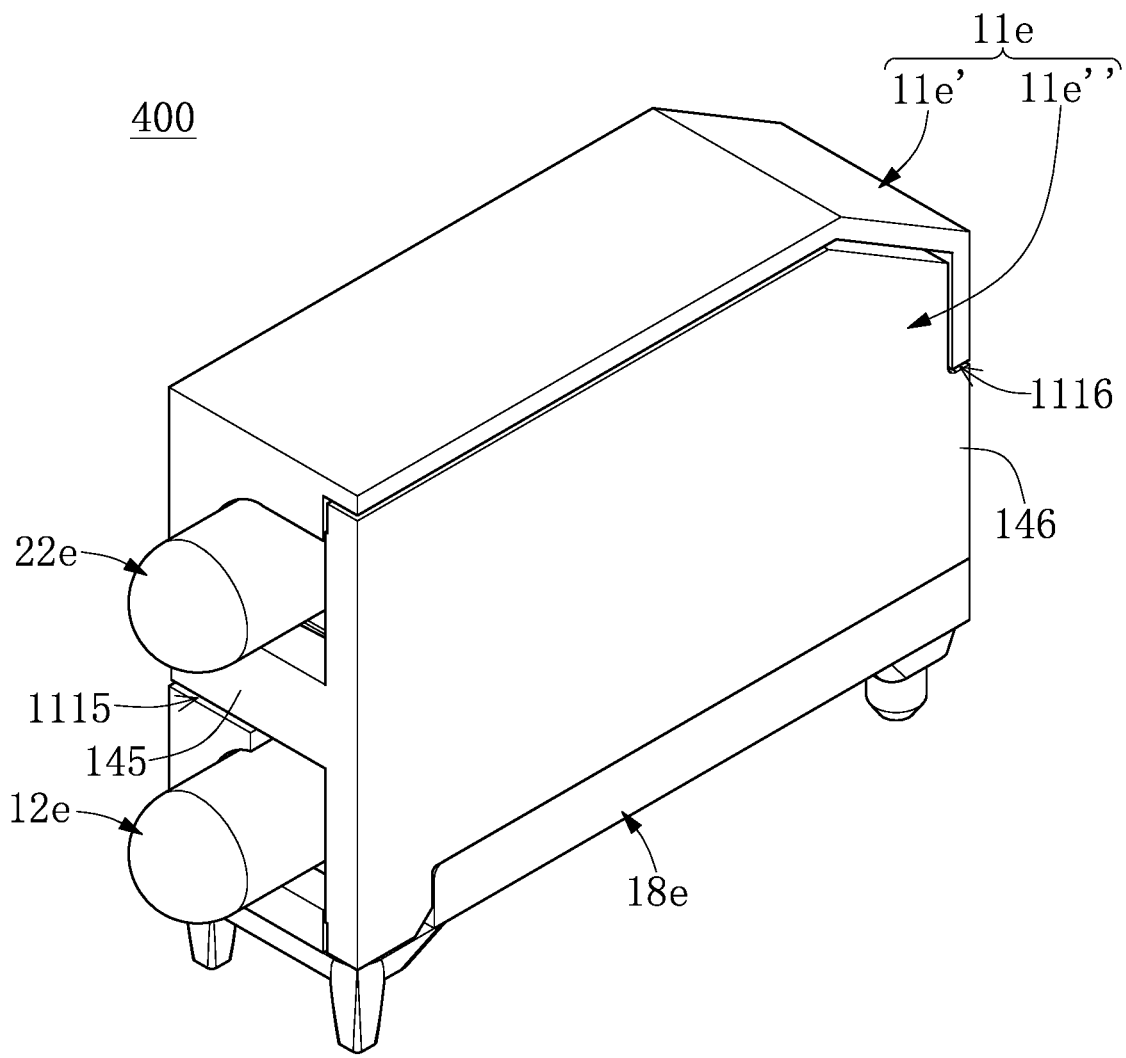
FIG. 15 is an assembled view of the light emitting module according to the fourth embodiment of the present disclosure.

Also, similar to the third embodiment, the second sub-housing 11*e*" of this embodiment can be a movable side cover, which is assembled to the first sub-housing 11*e*' by snap-fitting manner. Specifically, as shown in FIG. 13, the first sub-housing 11*e*' may include a first fixing structure, such as a front engaging groove 1115 and a back engaging groove 1116 respectively formed on a front side and a back side of the sub-housing 11*e*', and the second sub-housing 11*d*"' may include a second fixing structure, for example, a front engaging hook 145 and a back engaging hook 146 respectively protrude from an inner side of the second sub-housing 11*e*" facing the first sub-housing 11*e*', and can be respectively engaged with the front engaging groove 1115 and the back engaging groove 1116, so as to complete the assembly process.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A light emitting module, comprising:
   a housing including at least one passage passing through a first surface thereof and a second surface thereof, and a coupling portion formed on an inner surface of the housing adjacent to the second surface of the housing;
   at least one light guide element arranged in the at least one passage of the housing, wherein the at least one light guide element has a light emergent surface exposed at one end of the at least one passage and a light incident surface exposed at the other end of the at least one passage; and
   at least one light emitting element coupled to the housing by the coupling portion, wherein the at least one light emitting element has a light emitting surface facing to the light incident surface of the at least one light guide element and a soldering portion exposed from the housing, such that light emitted from the light emitting surface enters the light incident surface of the at least one light guide element and is then emitted from the light emergent surface of the at least one light guide element.

2. The light emitting module according to claim 1, wherein the coupling portion comprises an adhesive accommodating portion and an abutted surface, the adhesive accommodating portion is formed on the inner surface adjacent to the second surface of the housing, the adhesive accommodating portion faces towards a side surface of the at least one light emitting element, the abutted surface is formed perpendicular to the inner surface of the housing, the at least one light emitting element is arranged to abut against the abutted surface, and the light emitting surface and the light incident surface of the at least one light guide element correspond to each other.

3. The light emitting module according to claim 2, wherein the adhesive accommodating portion is disposed between the abutted surface and a bottom edge of the housing.

4. The light emitting module according to claim 3, wherein the adhesive accommodating portion is defined by a plurality of protruding ribs, the protruding ribs are perpendicular to the abutted surface, and a width of each of the protruding ribs is tapered from the abutted surface to the bottom edge of the housing.

5. The light emitting module according to claim 1, wherein the housing further includes at least one positioning protrusion, the at least one positioning protrusion protrudes from a bottom edge of the housing.

6. The light emitting module according to claim 1, wherein the at least one light guide element has a reflective surface, the reflective surface is inclined from the light incident surface of the at least one light guide element, an inner wall of the housing correspondingly has an inclined surface, and the reflective surface of the at least one light guide element abuts against the inclined surface of the housing.

7. The light emitting module according to claim 1, wherein an inner wall of the housing has a reflective surface that is inclined and used to reflect the light emitted by the at least one light emitting element to the light incident surface of the at least one light guide element.

8. The light emitting module according to claim 1, wherein the at least one light guide element has a reflective surface, the reflective surface forms a shape approximately similar to a parabolic curve.

9. The light emitting module according to claim 1, wherein a transparency of the light incident surface and that of the light emergent surface of the at least one light guide element are the same or different from each other.

10. The light emitting module according to claim 1, wherein the at least one light guide element further includes an engaging structure, the housing correspondingly includes a limiting structure, and the at least one light guide element and the housing are engaged with each other through the engaging structure and the limiting structure.

11. The light emitting module according to claim 1, wherein the housing and the at least one passage are an integrally-formed structure, and the at least one light guide element is injected and molded in the at least one passage, so as to the housing and the at least one light guide element are formed a one-piece integral structure.

12. A light emitting module capable of being mounted on a circuit board, the light emitting module comprising:
a housing including a first sub-housing and a second sub-housing, the first sub-housing and the second sub-housing being coupled to each other, the first sub-housing including:
a first surface with at least two openings and a second surface with at least two openings;
a partition structure protruding from an inner surface of the first sub-housing configured to define a first passage and a second passage, wherein the first passage and the second passage are spatially communicated with the corresponding openings formed on the first and second surfaces, respectively; and
at least one limiting structure formed on the inner surface of the first sub-housing;
a light guide unit disposed in the housing, the light guide unit including:
a first light guide element arranged in the first passage, wherein the first light guide element has a first light incident surface and a first light emergent surface, and the first light emergent surface is exposed through one of the at least two openings formed on the first surface; and
a second light guide element, separated from the first light guide element, arranged in the second passage, wherein the second light guide element has a second light incident surface and a second light emergent surface, and the second light emergent surface is exposed through another one of the at least two openings formed on the first surface; and
a light emitting unit coupled to the housing, the light emitting unit including:
a first light emitting element having a first light emitting surface and a first soldering portion, wherein the first light emitting surface faces toward the first light incident surface of the first light guide element, and the first soldering portion is exposed from the housing; and
a second light emitting element having a second light emitting surface and a second soldering portion, wherein the second light emitting surface faces toward the second light incident surface of the second light guide element, and the second soldering portion is exposed from the housing.

13. The light emitting module according to claim 12, wherein the partition structure is made of a non-transparent or substantially non-transparent polymeric material.

14. The light emitting module according to claim 13, wherein the at least one limiting structure is a protruding rib or a protruding bump disposed protruding from the inner surface of the first sub-housing, a top surface and/or a bottom surface of the partition structure, so as to limit and prevent the first light guide element and the second light guide element from being displaced or falling off from the first sub-housing.

15. The light emitting module according to claim 13, wherein the at least one limiting structure of the first sub-housing is a protruding column protruding from the inner surface of the first sub-housing, the first light guide element includes a first engaging structure protruding outward from an outer surface thereof, and the second light guide element includes a second engaging structure protruding outward from an outer surface thereof, the first engaging structure further forms a first through hole, the second engaging structure further forms a second through hole, the first light guide element and the second light guide element are limited in the housing through the first through hole and the second through hole being sleeved on the at least one limiting structure.

16. The light emitting module according to claim 15, wherein a thickness of the first engaging structure is half of that of the first light guide element, a thickness of the second engaging structure is half of that of the second light guide element, the first engaging structure and the second engaging structure are stacked to each other and sleeved on the at least one limiting structure, such that a side surface of the first light guide element and a side surface of the second light guide element are flush with each other.

17. The light emitting module according to claim 13, wherein the at least one limiting structure of the first sub-housing is a receiving slot, and at least one of the first and second light guide elements has an engaging structure extended outward from an outer surface thereof corresponding to the receiving slot, so as to engage each other.

18. The light emitting module according to claim 13, wherein the first sub-housing further includes at least one coupling portion formed on the inner surface adjacent to the second surface, the at least one coupling portion has an adhesive accommodating portion and an abutted surface formed perpendicular to the adhesive accommodating portion, the adhesive accommodating portion faces towards side surfaces of the light emitting unit, and the light emitting surfaces of the light emitting unit are arranged facing to the corresponding light incident surfaces and abut against the abutted surface.

19. The light emitting module according to claim 13, wherein the first sub-housing further includes a first fixing structure, the second sub-housing further includes a second fixing structure, and the second fixing unit is configured to directly contact the first fixing structure when the first sub-housing and the second sub-housing are coupled to each other.

20. A light-emitting device, comprising:
an integral housing including a plurality of separate passages, the passages passing through a first surface and a second surface of the integral housing;
a light guide unit including a plurality of light guide elements integrally formed in the corresponding passages of the integral housing, each of the light guide elements including a light emergent surface exposed at the first surface and a light incident surface exposed at the second surface; and
a light emitting unit including a plurality of light emitting elements coupled to the integral housing and respectively disposed corresponding to the light incident surfaces of the light guide elements;
wherein the integral housing is coupled to a printed circuit board, and the light emitting unit is electrically connected to the printed circuit board.

21. The light-emitting device according to claim 20, wherein the light guide elements are integrated molded in the integral housing by use of injection molding, insert injection molding, two-shot molding or a combination thereof.

* * * * *